July 12, 1932.  D. E. LINDQUIST  1,866,857

JOINT

Filed May 14, 1930

David E. Lindquist,
Inventor.
Deloz G. Haynes,
Attorney

Patented July 12, 1932

1,866,857

UNITED STATES PATENT OFFICE

DAVID E. LINDQUIST, OF PORT HURON, MICHIGAN, ASSIGNOR TO MUELLER BRASS CO., OF PORT HURON, MICHIGAN, A CORPORATION OF MICHIGAN

JOINT

Application filed May 14, 1930. Serial No. 452,452.

This invention relates to joints, and with regard to certain more specific features to joints between fittings and pipe or the like.

Among the several objects of the invention may be noted the provision of a telescoping joint which is adapted to receive fluid material between juxtaposed surfaces thereof; the provision of a joint of the class described in which there is used an inlet opening; and the provision of a device of the class described in which said inlet opening is movable to an advantageous position for permitting insertion of the fluid sealing material. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible emobdiments of the invention, Fig. 1 is a side elevation, showing an assembly of parts in which the invention is used;

Similar reference characters indicate corresponding parts throughout the several views of the drawing.

Figure 1:
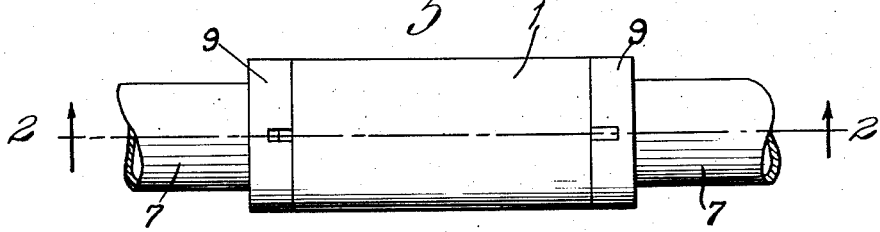
Figure 2:
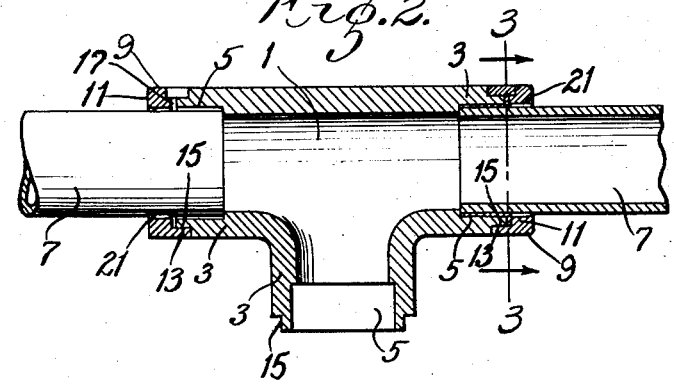
Fig. 2 is a longitudinal section taken on substantially line 2—2 of Fig. 1, certain parts being shown in elevation for clarity.

Referring now more particularly to Figs. 1 and 2, there is illustrated at Fig. 1 a fitting, comprising in the present instance, by way of example, a T. This T is representative of all types of fittings which may be used in connection with the invention.

The fitting 1 is provided with receiving portions 3 which are preferably counterbored as indicated at numerals 5 for telescopingly receiving lengths of pipe 7. It will be understood that the counterbore 5 is desirable but that in some instances the counterbore and the main bore of the receiving portion 3 may be the same. However, with the counterbore, the insertion of the pipe 7 is limited to a predetermined degree. The fit between the pipe and the fitting is such as to allow a clearance of an order of a few thousandths of an inch so that a capillary effect is had between the juxtaposed surfaces of the fitting and the pipe when liquid sealing material is introduced therebetween. The clearance is shown exaggerated in the drawing for clarity.

As set forth in certain co-pending applications on this subject, it is desirable that a sprue or opening be provided for delivering fluid sealing material such as solder to the juxtaposed surfaces. If such opening or sprue is drilled or otherwise formed in fitting 1, there results the conditions that sometimes in certain locations in a building, the sprue may be located in a downwardly projected position in which event it is more difficult to deliver solder thereto than if the sprue were upwardly located, in which position gravity aids the introduction of sealing material.

This invention overcomes this difficulty by making the sprue adjustable so that it may be put into the most advantageous position for introducing solder or sealing material. It should be understood that the gravitational limitation is not the only one. For instance, it may be desirable to rotate the opening from a position flat against a ceiling to a lateral or downward position and then feed solder in stick form or sealing material into the opening from below with heat. The general proposition is that the opening is to be made movable so that it may be put into the most advantageous position regardless of the considerations which enter into the choice of such most advantageous position.

In order to accomplish the above, I provide a ring or sleeve 9 which has an inwardly extending shoulder 11 which slidably fits the pipe 7. This shoulder 11 provides an internal groove 13 which slidably co-operates with a reduced extension 17 of the receiving portion 3 of fitting 1.

The width of the groove 13 is slightly greater than the length of the extension 15; it thereby leaves a peripheral space 17 upon assembly. The ring 9 is notched as indicated at numeral 19, said notch 19 communicating with the internal groove 13.

Referring to Fig. 2 at the left, it will be seen that assembly is accomplished by first applying the ring 9 over the pipe 7, and then entering the pipe 7 into the receiving portion 3 and then sliding the ring 9 into juxtaposition on the end of the extension 15. This leaves a slight clearance between the pipe 7 and the counterbore 5 of the fitting and also the space 17 between the ring and the end of the extension 17. At the same time there is a slight clearance 21 between the ring itself and the pipe 7.

Upon rotating the ring 9, the notch 19 is rotated and may be placed in any position after assembly of the elements. Inasmuch as the notch 19 communicates with the groove 13 by way of the opening 17, said peripheral opening 17 functions as a distributing channel for sealing material which may be poured into the notch 19. The sealing material runs around the distributing channel and thence into the clearance portions 5 and 21. Its distributive action in the clearance portions 5 and 21 takes place by capillary phenomenon. It is understood that the joint is properly cleaned and fluxed prior to operations hereinbefore described.

Figure 3:
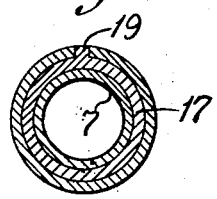
Fig. 3 is a cross section taken on line 3—3 of Fig. 2.
Figure 4:
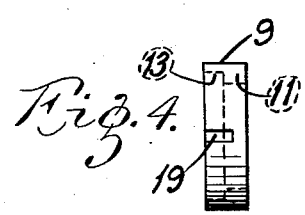
Fig. 4 is a side elevation of an adjusting ring or collar.

In Fig. 3 is shown how the notch 19 forms a receiving opening, said receiving opening being in communication with the peripheral opening 17 for delivery of solder or sealing material about the joint.

It is to be understood that the revoluble notch 19 may be used and the clearance or peripheral space 17 eliminated, in which event the sealing material, introduced into the notch 19, proceeds by capillary phenomenon between the ring 9 and the fitting and thence to the surfaces between the ring and pipe and fitting and pipe.

After the sealing material has been applied, it hardens. In the case of solder it hardens because the heat which is applied to the joint during application of the solder is withdrawn. If sealing material of an air hardening type is used, it hardens by virtue of its exposure.

While pipe has been described herein as the introduced member, it is to be understood that rods and the like may also be joined by the fittings herein described, without departure from the spirit of the invention.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A joint comprising a receiving portion, a member adapted to telescope therein, a sleeve slidable on said member and engageable with said receiving portion, said sleeve having a notch adapted to receive sealing material and deliver same to the assembled joint, said sleeve being revoluble with respect to said receiving portion before sealing material is applied and being rigidly held thereto by said sealing material after the sealing material has been applied.

2. A joint comprising a fitting having a receiving portion, a reduced extension on said receiving portion, a member adapted to telescope into said receiving portion, a sleeve rotatable on said member and slidable into engagement with said receiving portion, an internal groove in said ring adapted to fit over said reduced extension, said groove being deeper than the extension is long and a notch in the ring communicating with said groove.

3. A joint comprising a fitting having a receiving portion, a reduced extension on said receiving portion, a member adapted to telescope into said receiving portion, a sleeve rotatable on said member and slidable into engagement with said receiving portion, an internal groove in said ring adapted to fit over said reduced extension, said groove being deeper than the extension is long and a notch in the ring communicating with said groove and sealing material in the space between the fitting, pipe and ring.

In testimony whereof, I have signed my name to this specification this 5th day of May, 1930.

DAVID E. LINDQUIST.